Feb. 19, 1946. F. T. COURT 2,394,985
LEVER
Filed June 13, 1944
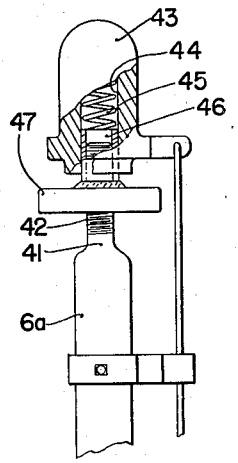
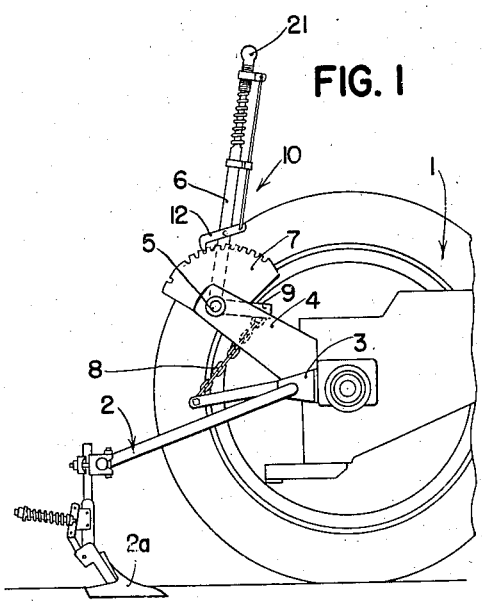
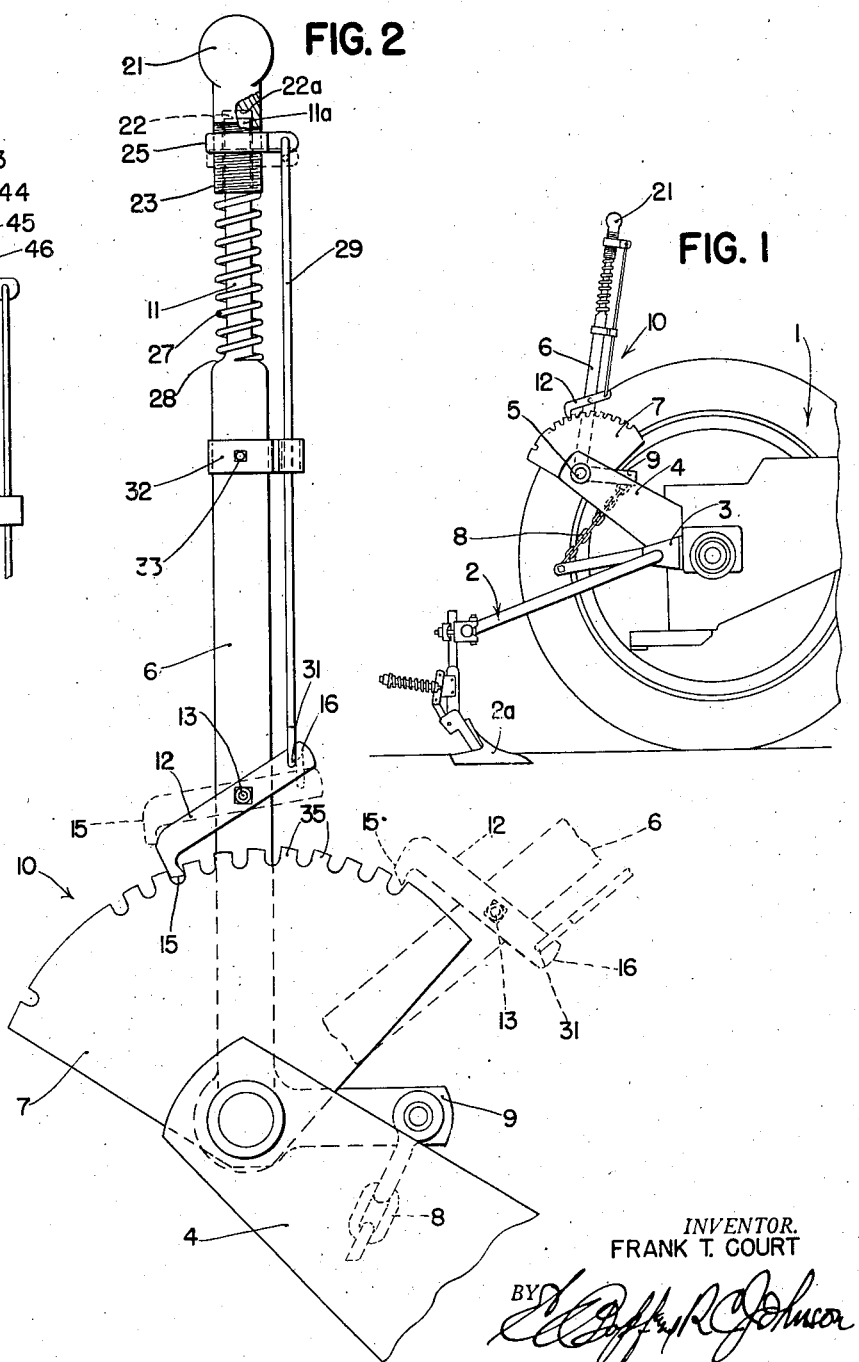
INVENTOR.
FRANK T. COURT
BY
ATTORNEYS

UNITED STATES PATENT OFFICE 2,394,985

LEVER

Frank T. Court, Moline, Ill., assignor to Deere & Company, Moline, Ill., a corporation of Illinois Application June 13, 1944, Serial No. 540,114

5 Claims. (Cl. 74—536)

The present invention relates generally to control levers for agricultural machines and the like, and more particularly to control levers of the type having a detent cooperating with a notched sector for releasably holding the lever in any position of adjustment.

The object and general nature of the present invention is the provision of a control lever mechanism that is arranged so that the control lever, when released from the sector, may be moved to any one of a number of different positions of adjustment and be automatically retained in that position of adjustment. A mechanism of this kind is particularly adapted for controlling the depth of operation of ground working tools that are adapted, for example, to be raised and lowered at the ends of the rows, as, for example, a cultivator, without requiring that the operator determine and select the desired depth adjustment each time the tools are raised and lowered. More specifically, it is a feature of this invention to provide a control lever mechanism, including a detent and a notched sector, so arranged that when the detent is in its released position, the lever may be swung a predetermined amount, at which time the detent will engage a preselected section of the sector, thus adjustably preventing any further movement of the lever in that direction, whereupon release of the control handle will automatically permit the detent to lock the lever to the sector in that position. Still further, it is a feature of this invention to provide such an arrangement in which means is present for changing the point at which the lever is automatically stopped. Thus, the tools or other operating unit may be moved into and out of a preselected position without requiring that that position be selected each time the change is made.

These and other objects and advantages of the present invention will be apparent to those skilled in the art after a consideration of the following detailed description, taken in conjunction with the accompanying drawing in which two embodiments of the present invention have been illustrated.

In the drawing:

Figure 1 is a side view of one form of the present invention, showing the same as incorporated in a tractor mounted cultivator.

Figure 2 is an enlarged view showing the details of the preferred form of adjusting lever.

Figure 3 is a fragmentary view illustrating a modified form of the invention.

Referring now more particularly to Figure 1, a conventional farm tractor is indicated in its entirety by the reference numeral 1 and has mounted thereon front and rear cultivator rigs, the rear rigs being indicated by reference numeral 2. The rear rigs 2 are pivotally mounted on the rear of the tractor by means of a bracket 3, and the rear axle of the tractor also carries a bracket 4 which supports a rockshaft 5 to which a hand lever 6 is connected. Secured to the bracket 4 is a sector 7. An arm 9 on the rockshaft 5 is connected with the rear rigs 2 by a chain or chains 8. The cultivator rigs 2 include ground working tools 2a.

The present invention is particularly concerned with the control lever mechanism, which is indicated in its entirety by the reference numeral 10 and of which the lever 6 and the sector 7 are parts. The control lever 6 consists of a flat strap member welded or otherwise secured at its lower end to the rockshaft 5 and formed at its upper end with a section 11 that is substantially round in section. A detent pawl 12 is pivotally mounted, as at 13, on the lever 6 adjacent the sector 7. The detent 12 is provided with a sector-engaging nose portion 15 and, at the other side of the pivot 13, with an extension 16.

A ball handle 21 having a central socket 22 is mounted for axial movement on the outer end 11 of the lever 6, and the ball handle member 21 is provided with an elongated exteriorly threaded shank section 23 with respect to which the socket 22 is substantially concentric. A collar 25 is interiorly threaded and is screwed onto the threaded neck portion 23 of the ball handle 21. A spring 27 is disposed between the shouldered section 28 of the lever 6 and the lower end of the ball handle 21. A connecting link 29 is fixed at its upper end to the collar 25 and at its lower end is pivotally connected, as at 31, to the detent extension 16. A guide 32, comprising a strap bent into U-shape, is fixed, as by a rivet 33, to the lever 6 and receives the link 29. The guide 32 cooperates with the link 29 to prevent the collar 25 from being rotated when the ball handle 21 is turned in one direction or the other to adjust its position relative to the collar 25.

The sector 7 is of particular construction. It will be noted that the sector 7 is provided with a plurality of teeth 35 and that the teeth 35 are disposed in a line that is not arcuate about the axis of the shaft 5; instead, the teeth 35 are arranged in a non-arcuate manner with respect to the axis of movement of the lever 6, being so constructed that in a forward direction each successive tooth is disposed at a slightly increased distance from the axis of the shaft 5.

The operation of this form of the invention as so far described is substantially as follows: The spring 27 normally acts against the ball handle 21 to force the same axially outwardly of the lever 6 and thus to act through the link 29 to swing the nose 15 of the pawl 12 into engagement with the sector 7. The detent 12 may be released from the sector 7 by pushing downwardly on the ball handle 21 until the bottom 22a of the socket 22 engages the top of the lever 6. This serves as a stop to limit the axially inward movement of the ball handle 21 and hence limits the outward swinging of the detent 12 with respect to the sector. When thus the detent 12 is released from the sector, the lever 6 may be swung forwardly to lower the cultivator rig 2 into an operating position. It will be noted that when the ball handle 21 is held with the bottom of its socket 22a against the end of the lever 6, the nose 15 of the detent 12 describes a path which is generally arcuate or circular about the axis or the shaft 5 but which approaches the ends of the teeth 35. In other words, the path of movement of the detent makes an angle $a$ with the line that passes through the ends of the sector teeth. Eventually, even though the ball handle 21 is held down against the end of the lever, the nose 15 of the detent 12 will engage one of the teeth 35, thus limiting further movement of the lever 6 in that direction. Then the ball handle 21 may be released and the spring 27, acting through the ball 21 and link 29, will cause the detent to lock in the space between the tooth 35 that was engaged by the detent section 15 and the next adjacent tooth. Rearward movement of the lever 6 raises the tools 2a and the sector 7 has a notch 38 to receive the detent section 15 to lock the tools in their raised position.

The point on the sector which the detent will engage, as described, varies with variations in the ball handle 21 in the collar 25. That is, when the ball handle is screwed downwardly into the collar 25 the space between the end 11a of the lever 6 and the bottom 22a of the socket 22 becomes smaller, and hence the lever 6 can be moved relative to the sector 7 only a relative short distance before the detent 12, held in its released position, comes up against one of the teeth 35. On the other hand, if the ball handle 21 is turned outwardly of the collar 25, the effect of then pressing the ball 21 down to unlatch the lever 6 is to move the detent nose 15 farther away from the sector, and therefore the lever 6 can then be swung much farther forwardly before the detent engages a tooth than in the first mentioned adjustment.

Thus, by turning the ball handle 21 into different positions in the collar 25, the stop means 11a, 22a is adjusted to select the point or tooth on the sector at which the lever 6 will be automatically stopped. In this way, by setting the ball handle 21, the farmer may raise and lower the tools without having to select the depth adjustment each time the tools are lowered. If he should desire to have the tools work deeper all he has to do is to back off the ball handle 21 a turn or two, whereupon the detent can be raised higher and the lever moved into a more forward selected position. Of course, any more shallow operating position may be had at any time when lowering the tools, merely by releasing the ball handle 21 before the lever reaches its selected forward position. Further, when the detent 12 is latched to the sector 7, the ball handle 21 may be screwed inwardly until the portions 11a and 22a engage, and then the detent is held in latched position with the sector 7, thus locking the lever 6 either in its raised position or in any of its working positions.

In Figure 3 I have shown a slightly different form of the present invention. In this form, the lever 6a is provided with a rounded upper end 41 which is screw-threaded, as at 42, in the lower portion thereof. A ball handle 43 is mounted slidingly on the upper portion thereof and is provided with a socket 44 in which a spring 45 is disposed. The spring 45 extends downwardly and at its lower end engages the upper end of a threaded bushing 46 which is threaded onto the section 42 of the lever 6a. At its lower end the threaded bushing 46 carries a flange or collar 47 secured thereto, as by welding, the flange serving as means accessible to the operator for turning the bushing 46 into different positions along the upper end of the lever 6a. The bushing or collar 46 thus serves as a stop adjustable axially along the lever 6a for limiting the downward movement of the ball handle 43 in substantially the same way that the stop means 11a, 22a acts in the form of the invention shown in Figure 1. The operation of the form of the invention shown in Figure 2 is substantially the same as the operation of the form of the invention shown in Figure 1, and hence further description is believed to be unnecessary. By placing the hand over the ball handle 43, it is a relatively simple matter to turn the collar 47 inwardly or outwardly along the threaded portion of the handle 6a, thus adjusting the point at which the lever 6a will automatically be stopped by the engagement of the detent with the sector.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A control lever mechanism for farm implements, comprising a sector having teeth, a lever movable relative to said sector and carrying a detent movable relative to the lever into and out of a released position, said sector and lever being positioned one with respect to the other so that when the lever is moved with the detent in a released position the path of movement of the detent approaches the teeth of said sector, whereby at one point in the movement of said lever in one direction said detent will come into engagement with said sector and prevent further movement of the lever relative to the sector in that direction, and means for changing the released position of the detent relative to the lever, so that the detent will contact the sector at variable points in the movement of the lever.

2. A lever and sector construction comprising a sector carrying a lever pivot, a series of teeth arranged arcuately about a center spaced from said lever pivot, a lever movable about the axis of said lever pivot, a detent carried by said lever and movable between latched and released positions, and means for shifting said detent so that the detent will contact the sector at variable points in the movement of the lever.

3. A lever and sector construction comprising a sector carrying a lever pivot, a series of teeth arranged arcuately about a center spaced from said lever pivot, a lever movable about the axis of said lever pivot, a detent carried by said lever, a support shiftable on said lever, a member carried by said support and movable between two given positions, means connecting said member with said detent for moving the latter, between latched and released positions, and means for shifting said member so as to act through the latter to shift said detent and change its released position relative to the lever so that the detent will contact the sector at variable points in the movement of the lever.

4. In a lever mechanism, the combination of a lever having a detent movable along a given path when the lever is moved, a sector having a toothed part lying substantially in a line extending at an angle to said detent path, and means for shifting said detent relative to the lever so that the detent will contact the sector at variable points in the movement of the lever.

5. A control lever mechanism comprising a sector, a lever pivoted thereto, stepped teeth formed on said sector and arranged non-arcuately relative to the pivot axis of said lever, a detent pivoted to said lever and having a sector-engaging portion, an operating handle biased for movement in one direction and connected to releasably hold the detent in engagement with said sector, and an adjustable stop limiting the movement of said handle in the other direction, whereby moving the handle against said stop moves the detent into a position releasing the lever for movement relative to the sector until the detent in its released position strikes a tooth on said sector.

FRANK T. COURT.